United States Patent
Proux

(10) Patent No.: US 10,652,236 B2
(45) Date of Patent: May 12, 2020

(54) ELECTRONIC CROWD-BASED AUTHENTICATION

(71) Applicant: Conduent Business Services, LLC, Dallas, TX (US)

(72) Inventor: Denys Proux, Vif (FR)

(73) Assignee: Conduent Business Services, LLC, Florham Park, NJ (US)

( * ) Notice: Subject to any disclaimer, the term of this patent is extended or adjusted under 35 U.S.C. 154(b) by 329 days.

(21) Appl. No.: 15/462,038

(22) Filed: Mar. 17, 2017

(65) Prior Publication Data

US 2018/0270224 A1 Sep. 20, 2018

(51) Int. Cl.
| H04L 29/06 | (2006.01) |
| H04W 12/06 | (2009.01) |
| H04L 9/32 | (2006.01) |
| H04L 9/08 | (2006.01) |
| H04W 88/16 | (2009.01) |

(52) U.S. Cl.
CPC .......... *H04L 63/0853* (2013.01); *H04L 9/088* (2013.01); *H04L 9/3213* (2013.01); *H04L 63/08* (2013.01); *H04L 63/10* (2013.01); *H04W 12/06* (2013.01); *H04L 69/16* (2013.01); *H04W 88/16* (2013.01)

(58) Field of Classification Search
CPC .......... H04L 63/08; H04L 63/10; H04L 9/088
See application file for complete search history.

(56) References Cited

U.S. PATENT DOCUMENTS

| 6,671,737 | B1 | 12/2003 | Snowdon et al. | |
| 7,170,998 | B2 * | 1/2007 | McLintock | G07C 9/00103 340/5.23 |
| 8,819,851 | B1 * | 8/2014 | Johansson | H04L 63/0428 726/28 |
| 9,197,615 | B2 | 11/2015 | Falk et al. | |
| 9,209,974 | B1 | 12/2015 | Akinyele et al. | |
| 9,317,985 | B2 * | 4/2016 | Tehranchi | G07C 9/00111 |
| 9,413,780 | B1 | 8/2016 | Kaplan et al. | |
| 9,433,031 | B2 | 8/2016 | Hiramatsu | |
| 9,444,522 | B2 | 9/2016 | Yang et al. | |
| 9,460,433 | B2 | 10/2016 | Proctor, Jr. et al. | |
| 9,485,249 | B2 | 11/2016 | Jeal et al. | |
| 9,496,927 | B1 | 11/2016 | Grinberg et al. | |

(Continued)

OTHER PUBLICATIONS

US 9,560,582 B2, 01/2017, Chow et al. (withdrawn)
(Continued)

*Primary Examiner* — James R Turchen
(74) *Attorney, Agent, or Firm* — Kermit D. Lopez; Luis M. Ortiz; Ortiz & Lopez, PLLC

(57) ABSTRACT

Methods and systems for electronic crowd-based authentication. An example embodiment includes operations or steps for selecting authentication criteria with corresponding validity criteria through a key ring application, pairing the key ring application with authentication data, and transmitting the authentication data for verification by a security server, thereby allowing a trusted user to endorse an unregistered user to provide the unregistered user with access to a secured resource by the selecting of the authentication criteria, the pairing of the key ring application, and the transmitting of the authentication data for verification by the security server.

20 Claims, 6 Drawing Sheets

(56) References Cited

U.S. PATENT DOCUMENTS

| | | | |
|---|---|---|---|
| 9,507,015 | B2 | 11/2016 | Krishnakumar et al. |
| 9,521,648 | B1 | 12/2016 | Kolekar et al. |
| 9,537,946 | B2 | 1/2017 | Atias et al. |
| 9,553,855 | B2 | 1/2017 | Pal et al. |
| 9,843,649 | B1 * | 12/2017 | Hampson ............... H04L 67/325 |
| 10,217,304 | B2 * | 2/2019 | Chen ................. G07C 9/00309 |
| 10,229,548 | B2 * | 3/2019 | Daniel-Wayman ......................... G07C 9/00309 |
| 2007/0299625 | A1 | 12/2007 | Englert et al. |
| 2009/0283591 | A1 | 11/2009 | Silbernagl |
| 2011/0219067 | A1 * | 9/2011 | Bernosky .......... H04L 29/12066 709/203 |
| 2012/0066302 | A1 | 3/2012 | Petersen et al. |
| 2012/0234914 | A1 | 9/2012 | Roux |
| 2013/0303143 | A1 | 11/2013 | Schrader et al. |
| 2013/0305357 | A1 * | 11/2013 | Ayyagari ............... H04W 12/06 726/22 |
| 2014/0168174 | A1 | 6/2014 | Idzik et al. |
| 2014/0201066 | A1 | 7/2014 | Roux et al. |
| 2014/0365781 | A1 * | 12/2014 | Dmitrienko ............ G06F 21/34 713/185 |
| 2014/0373111 | A1 * | 12/2014 | Moss .................... H04W 12/08 726/5 |
| 2015/0142520 | A1 | 5/2015 | Bala et al. |
| 2015/0188922 | A1 | 7/2015 | Parmar et al. |
| 2015/0350204 | A1 | 12/2015 | Wang et al. |
| 2015/0372720 | A1 | 12/2015 | Shimshoni |
| 2016/0135046 | A1 | 5/2016 | John Archibald et al. |
| 2016/0156386 | A1 | 6/2016 | Van Nieuwenhuyze et al. |
| 2016/0189461 | A1 | 6/2016 | Kanon et al. |
| 2016/0226833 | A1 | 8/2016 | Dawson |
| 2016/0254589 | A1 | 9/2016 | Ju et al. |
| 2016/0261973 | A1 | 9/2016 | Socol et al. |
| 2016/0275648 | A1 | 9/2016 | Honda et al. |
| 2016/0277187 | A1 * | 9/2016 | Nabeel ................. H04L 9/3093 |
| 2016/0342821 | A1 | 11/2016 | Nyalamadugu et al. |
| 2016/0359855 | A1 | 12/2016 | Sakura et al. |
| 2016/0381062 | A1 | 12/2016 | Ahmed Assem A. S. et al. |
| 2017/0220792 | A1 * | 8/2017 | Rea ....................... H04L 63/105 |
| 2017/0223005 | A1 * | 8/2017 | Birgisson ............ H04L 63/0807 |
| 2018/0047232 | A1 * | 2/2018 | Sakumoto .......... G07C 9/00817 |

OTHER PUBLICATIONS

Trafton, A., New cheap NFC sensor can transmit information on hazardous chemicals, food spoilage to smartphone, Phys. Org., Dec. 8, 2014, 3 pages, http://phys.org/news/2014-12-cheapsensor-transmit-hazardous-chemicals.html.

Pre-Interview Communication dated Jul. 28, 2017 in U.S. Appl. No. 15/421,634.

Shockley, J. A., Ground Vehicle Navigation Using Magnetic Field Variation, Dissertation, Department of the Air Force Air University, Wright-Patterson Air Force Base, Ohio, Sep. 2012, 186 pages.

Subbu, K. P. et al., LocateMe: Magnetic-Fields-Based Indoor Localization Using Smartphones, ACM Trans. Intell. Syste. Technol. (2013) 4, 4, Article 73, 27 pages.

Burkard, S., Near Field Communication in Smartphones, https://www.snet.tu-berlin.de/fileadmin/fg220/courses/WS1112/snet-project/nfc-in-smartphones_burkard.pdf, 2012, 10 pages.

Michel, T. et al., On Attitude Estimation with Smartphones, International Conference on Pervasive Computing and Communications (PerCom 2017) 11 pages.

* cited by examiner

ELECTRONIC CROWD-BASED AUTHENTICATION

TECHNICAL FIELD

Embodiments are generally related to the field of user authentication for access to secure resources. Embodiments also relate to electronic crowd-based authentication and key ring applications.

BACKGROUND

Securing access to restricted resources is a challenging issue and may require a careful evaluation of contradictory considerations. On one hand a need exists to ensure that restricted resources can be only accessed by authorized individuals (i.e., which sometimes can lead to an escalation of verification measures). On the other hand, there is a need to implement secure access measures that are as convenient and seamless as possible to avoid bothering people (i.e., which may result in making them turn away).

Different solutions have been considered to address these two conflicting objectives. One solution involves unregistered users who want to access a given resource. For these users, a full n-factor authentication process requires a user to provide various forms of proofs of identification (e.g., as many proofs as the paranoia of security enforcers may think of) of his or her identity. This approach may be very bothersome and annoying to the use and generally slows down significantly the time spent to pass, for example, checkpoint gates. As a result, long queues can occur in front of these gates.

The flip side of this approach involves registered users. In order to address the bottleneck issue at security gates, security enforcers have developed the concept of registered/frequent/trusted users. These users pre-register with a given security program providing all personal information required by the security policy. Such users receive a specific user ID which will allow them, first, to be recognized by the system (i.e., hence, less identification proof needs to be provided); and second, to pass security check-points faster (i.e., as the n-factor authentication process could be relaxed). The problem with this approach is that people may not be willing to (or could not) pre-register. Specifically when security is required for a single event, the users typically do not plan to become frequent users.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and system for authenticating users.

It is another aspect of the disclosed embodiments to provide for an electronic crowd-based authentication method and system.

The aforementioned aspects and other objectives and advantages can now be achieved as described herein. Methods and systems are disclosed for electronic crowd-based authentication. An example embodiment includes operations or steps for selecting authentication criteria with corresponding validity criteria through a key ring application, pairing the key ring application with authentication data, and transmitting the authentication data for verification by a security server, thereby allowing a trusted user to endorse an unregistered user to provide the unregistered user with access to a secured resource by the selecting of the authentication criteria, the pairing of the key ring application, and the transmitting of the authentication data for verification by the security server.

The disclosed embodiments allow trusted users to endorse unregistered users to give them access to a protected resource or space. The main goal is to reduce the complexity involved in obtaining access rights for an unknown and potentially transient user by trusting a well-known user. The disclosed approach relies on a key ring application installed on all users' mobile devices. To endorse a new user, the trusted user first selects or defines the relaxed authentication scheme with corresponding validity criteria through his/her key ring application. Then, he or she pairs his or her key ring application with that of the new user transmitting the authentication token (e.g., authentication data). At access time, the token is transmitted and verified by the security server. The disclosed embodiments are likely not to be used in environments requiring high security, but under lower security needs where trusted people take responsibility for individuals they know. One of the advantages of the disclosed embodiments is the flexibility of the solution not requiring any hardware components such as, for example, identification badges.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Figure 1:
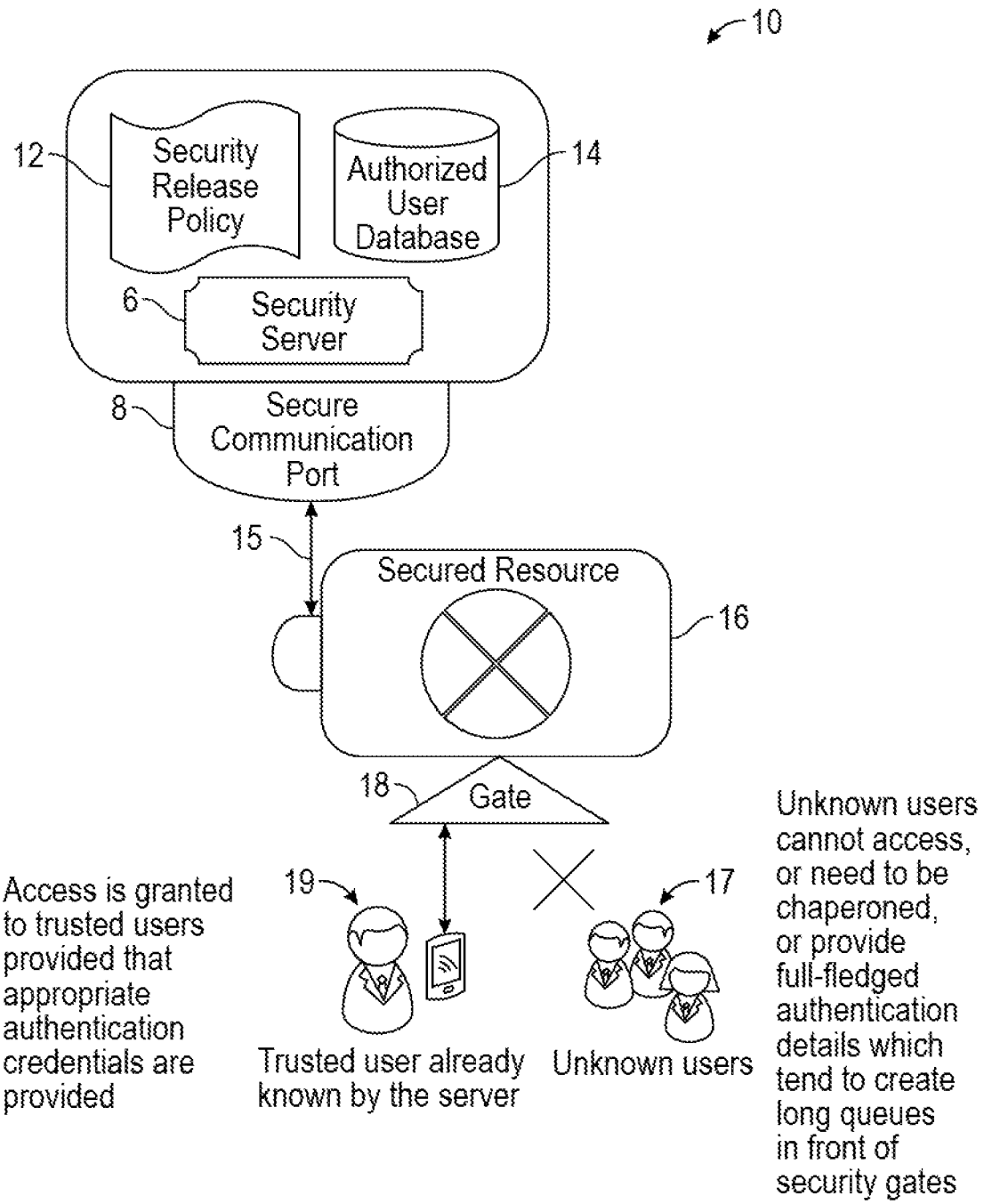
FIG. 1 illustrates a block diagram depicting a system for electronic crowd-based authentication, in accordance with an example embodiment.

FIG. 1 illustrates a block diagram depicting a system 10 for electronic crowd-based authentication, in accordance with an example embodiment. The system 10 includes a security server 6 associated with and/or which communicates with an authorized user database 14. The server 6 and the database 14 are associated with a security release policy 12. The security server 6 can communicate with other resources such as a secured resource 16 through a secure communication port 8 via a secure communication channel 15.

The secured resource 16 can be associated with a security gate 18, such as, for example, a secure entry point with respect to the secured resource 16, which may be, for example, a facility or area. Access to the secured resource 16 can be granted to trusted users such as trusted user 19, provided that appropriate authentication credentials are provided. In the example scenario depicted in FIG. 1, the trusted user 19 may be already known by the server 6. In the scenario shown in FIG. 1, one or more unknown users 17 may not access the secured resource 16 or may need to be chaperoned to the secured resource 16, or may need to provide full-fledged authentication details, which tends to create long queues in front of security gates.

As will be discussed in more detail below, the disclosed embodiments allow a trusted user to "endorse on the fly" un-registered individuals to allow such individuals to access resources such as the secured resource 16 "as-if" they were registered users (e.g., if the security policy 12 allows such "upgrading").

The disclosed example embodiments can involve three aspects including the security server side, the secured resource side, and the user side. The security server side can include the security release policy 12, which can be implemented as a statement that defines criteria that allows a given type of user to access a given type of secured resources, and more specifically which define criteria allowing a n-factor authentication to be down-graded to a (n-m) factor authentication. The security server side can further include the authorized user database 14, which can contain details about all known/trusted users along with their personal ID and the type of secured resources they are allowed to access (e.g., plus the type of "endorsements" that are allowed to provide to the unknown users 17).

The security server side includes the security server 6, which constitutes a system that manages authorization and communication with gates protecting the secured resources 16 in order to authorize or not the access. The security server side further includes the secure communication channel 15, which is a way for the security server 6 to communicate with gates protecting secured resources. A wireless communication channel may also be needed to communicate with trusted user "key ring" or "keyring" application running on a mobile device (e.g., smartphone). This wireless communication can be achieved using, for example, standard GSM channels, Wi-Fi, etc.

The secured resource side can include the secured resource 16 where access can be granted only through the gate 18. This concept of a "gate" can be related either to a physical gate or a software gate (e.g., a web portal where appropriate credentials should be provided to access next steps of the process). The secured resource side can also include the secure communication channel 15, which in this context can be implemented as a way for the gate 18 to communicate with the security server 6. This communication channel allows for the sending of user identification details and for the receipt of to receive access authorization. The communication channel can be either physical (e.g., wired) or wireless. The gate 18 can be also associated with the secured resource side. The gate 18 can constitute a way to check user ID's and to allow or block access to the secured resource 16. The gate 18 can be preferably configured to communicate with a "keyring" application running on a user device to access a user ID and credential information. This communication can be wireless. Different types of technology can be utilized here such as, for example, Wi-Fi, Bluetooth, or NFC.

The user side includes a mobile device with wireless communication capabilities, which can run software applications such as the aforementioned "key ring" or "keyring." The mobile device should be able to communicate with gates through technologies such as Wi-Fi, Bluetooth, or NFC. The mobile device should also communicate with the security server 6 using wireless communication channels such as standard GSM channels or Wi-Fi. The mobile device should further be configured to communicate with other "keyring" applications running on other devices through short distance wireless communication (e.g., Wi-Fi, Bluetooth, or NFC). The mobile device should also be able to download a software application from the Internet such as the aforementioned "keyring."

The user side includes a "keyring" or "key ring" application running on the mobile device. This application contains user ID and credential information that can be transmitted to the gate 18 for obtaining access to the secured resource 16. The keyring also provides an interface for the trusted user to endorse invitees and to set the validity criteria for this endorsement.

Figure 2:
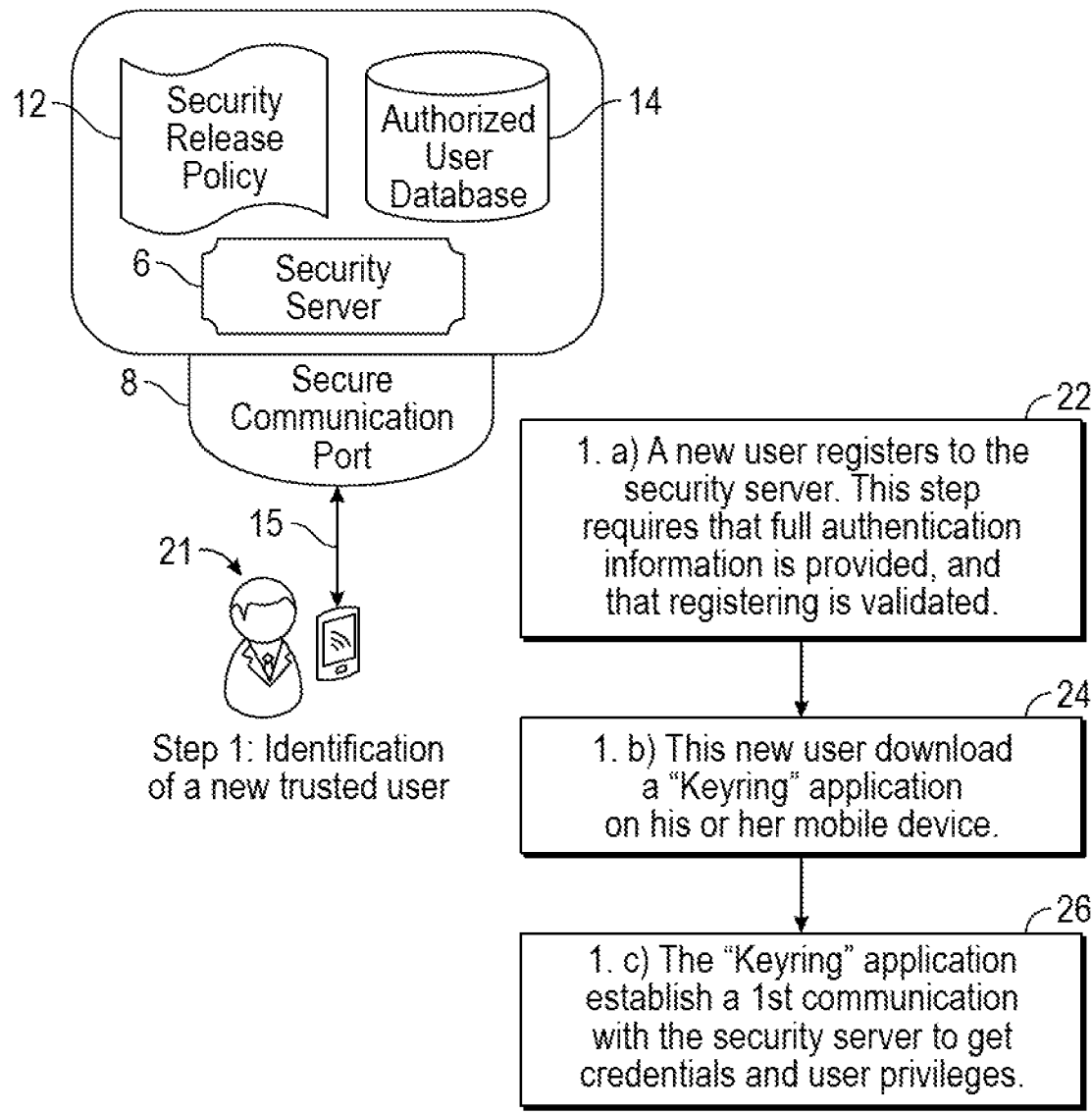
FIG. 2 illustrates a first step of a process for electronic crowd-based authentication, in accordance with an example embodiment.

FIG. 2 illustrates a first step of a process for electronic crowd-based authentication, in accordance with an example embodiment. The first step illustrated in FIG. 2 involves identification of a new trusted user 21. As shown at block 22, a new user is registered with or to the security server 6. This step requires that full authentication information be provided and that registering is validated. As depicted next at block 24, this new user can download the "keyring" application on his or her mobile device. Thereafter, as illustrated at block 26, the "keyring" application establishes a first communication with the security server 6 to obtain credentials and user privileges. The step shown in FIG. 2 facilitates future access to secured resources using the authentication "keyring" to downgrade authentication factors on a given resource if the security policy 12 and user access allows this feature.

Block 22 illustrates an operation in which a new user registers to the security server. This step requires that full authentication information is provided, and that registering is validated. Based on user credentials and what is defined in the security release policy 12, this user will be able to get access to a specific list of secured resources. Furthermore, the user will be able, depending on a specific context (e.g., during normal business hours or for a given period of time) defined in the security release policy 12, to endorse unknown users and give them access to specific secured resources.

Block 24 depicts an operation in which new users can download a "keyring" application available, for example, at the Apple store or Android store and install this software on his or her device. Block 26 describes an operation in which the "keyring" application establishes a first communication with the security server to obtain user ID and credentials.

The new user 21 now can become a registered user. Note that a registered user may not always be a trusted user. How a user becomes a trusted user should be defined in the security policy 12. For example, a registered user may be able to become a trusted user after using the system for a pre-defined amount of time and can also be co-opted as a trusted user by another (or several) trusted users.

This approach facilitates future user access to secured resources using his or her authentication "keyring" to downgrade authentication factors on a given resource if the security release policy and user access right allow this.

While accessing the secured resource 16 protected by the gate 18 as defined in the pre-requisites, the registered user can use his or her "keyring" application to share ID and credential with the gate 18 using wireless communication (e.g., Wi-Fi, Bluetooth, or NFC). Depending on the context (e.g., time, location, etc.) and rules defined in the security policy, he/she may be required to provide a password (e.g., or biometric information) via the keyring.

Figure 3:
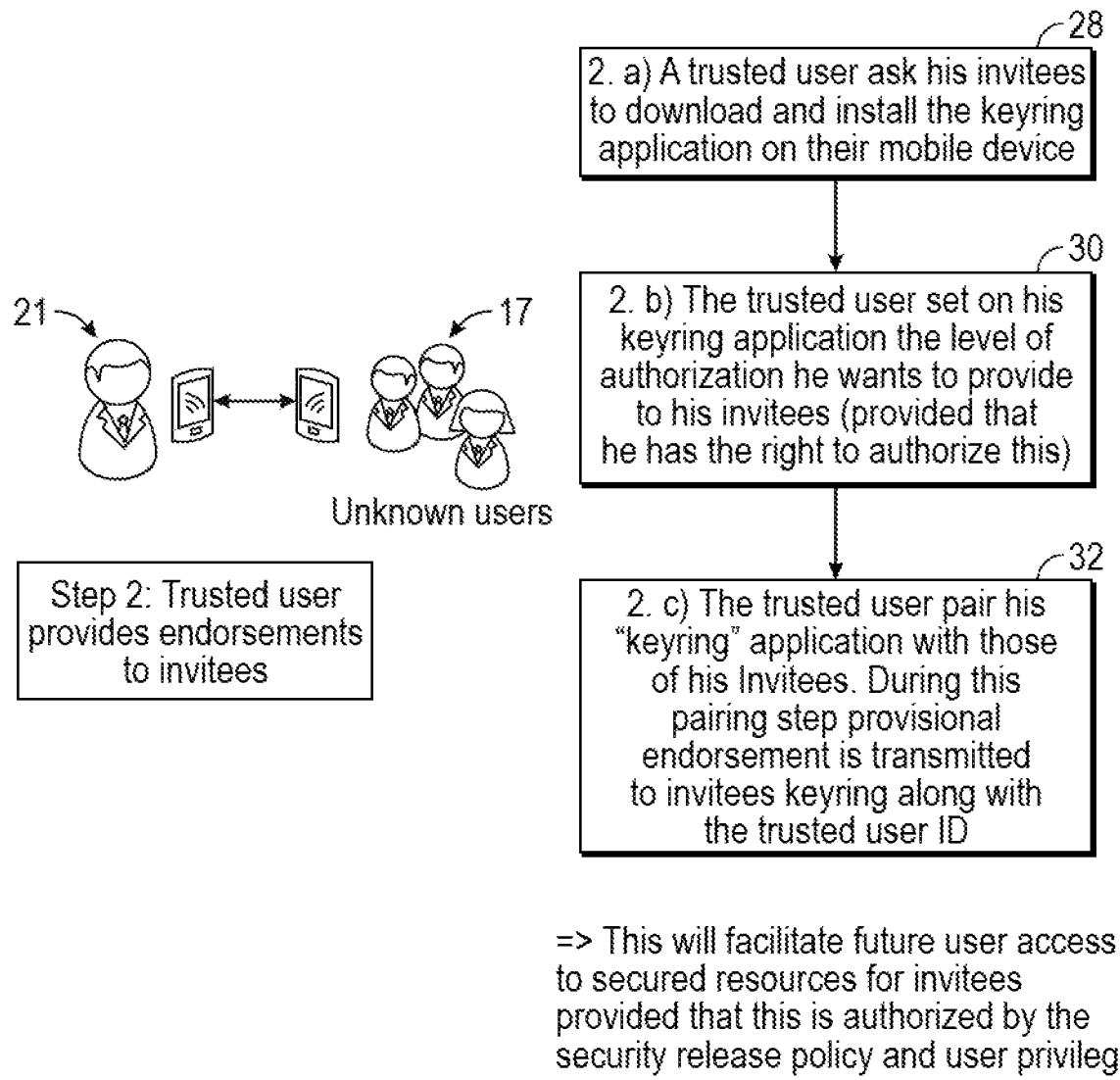
FIG. 3 illustrates a second step of a process for electronic crowd-based authentication, in accordance with an example embodiment.

FIG. 3 illustrates a second step of a process for electronic crowd-based authentication, in accordance with an example embodiment. The step illustrated in FIG. 3 involves the endorsement of new users/invitees. That is, in the operations depicted in FIG. 3, a trusted user can provide endorsements to invitees. A trusted user can decide to provide endorsement to invitees to facilitate their access to the secured resource 16 without asking them to go through a full pre-registration process. In order to do so, as indicated at block 28, a trusted user asks his or her invitees to download and install the keyring application on the invitees' mobile device or mobile devices.

As depicted at block 30, the trusted user enters on his or her keyring application details to create a new endorsement. These details can specify: which type of secured resource can be accessed, for which time frame, and at which location. The trusted user can also request for an endorser validation or not (e.g., this may be the case when the endorser is not always with the invitees, but wants to know when the invitee accesses a resource). Therefore, a notification can be sent from the gate 18 and via the security server 6 to the trusted user so that he or she can validate via the keyring the demand for access. Finally, as depicted at block 32, the trusted user can pair his or her "keyring" application with those of the invitees. During this pairing, a provisional endorsement can be transmitted to invitees' keyring along with the trusted user ID and endorsement criteria.

The approach depicted in FIG. 3 can facilitate future user access to secured resources for invitees provided that this is authorized by the security release policy 12 and user privileges. Of course, not all registered users may be allowed to endorse invitees. This should be defined in the policy 12. Also, the trusted user in some situation might be allowed to endorse only for specific periods of time. This also should be defined in the policy 12.

Figure 4:
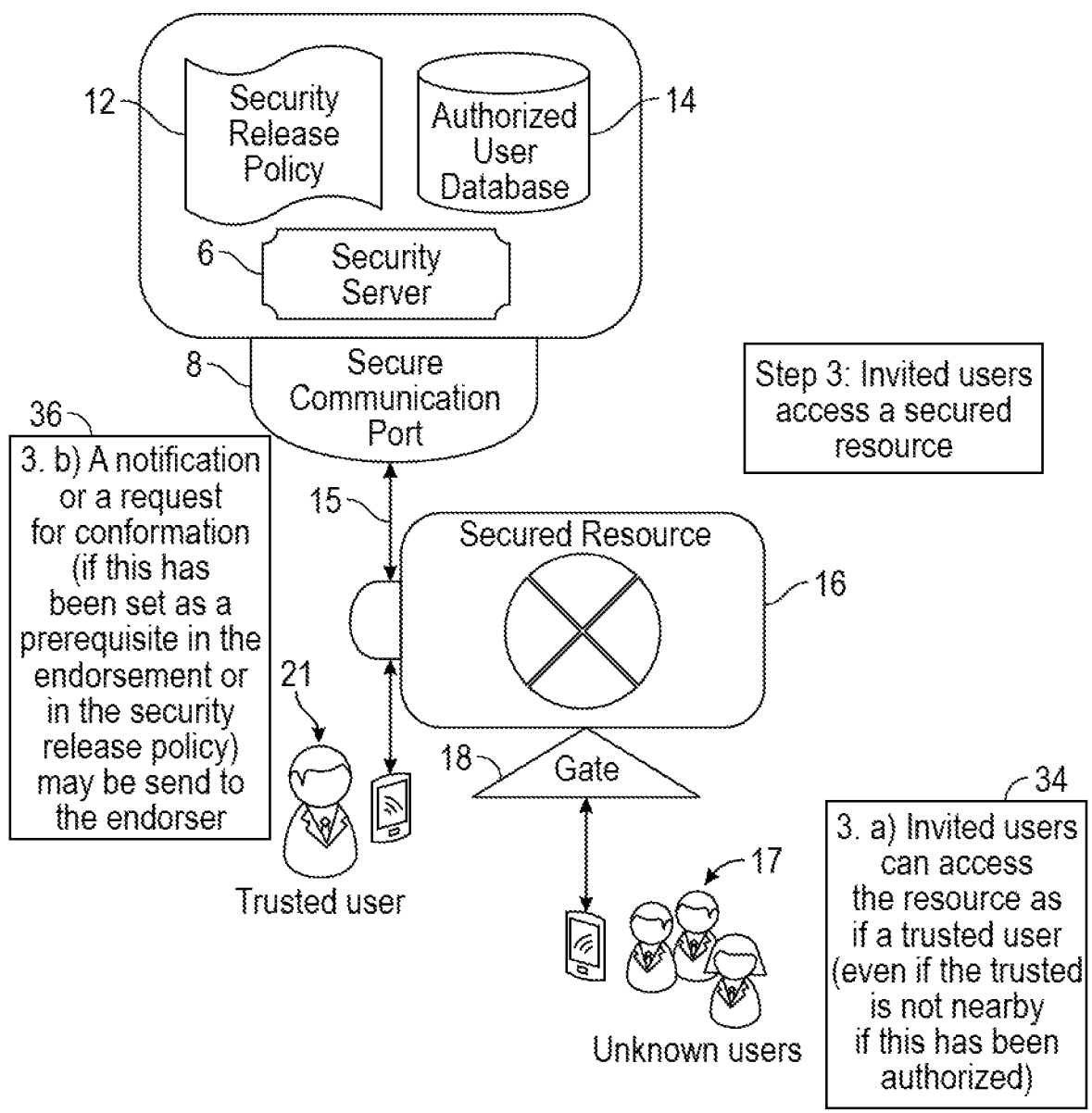
FIG. 4 illustrates a third step of a process for electronic crowd-based authentication, in accordance with an example embodiment.

FIG. 4 illustrates a third step of a process for electronic crowd-based authentication, in accordance with an example embodiment. In the operations depicted in FIG. 4, the invitees may access a secured resource. As shown at block 34, the invited users can access the secured resource 16 even if the trusted user 21 is not nearby (if such access has been authorized). The invitees can use their own respective keyring applications at the gate to provide their respective ID's and credentials. As depicted at block 36, the gate 18 can communicate invitee credentials with the security server 6 to "know" whether or not the invitee can be granted access. Note that optionally, an operation can be implemented wherein if this has been specified in the endorsement criteria, the security server 6 can be instructed to send a notification to the endorser's keyring to inform him or her that his or her invitee wants to access the secured resource 16. This communication can be accomplished via a "push" sent to the trusted user keyring. If this has been defined in this manner, the trusted user may be asked to validate (or not) the request for access. Once the access is granted, the invitee can access the resource 16.

An extension to the method or process depicted and discussed herein with respect to FIGS. 1-4 can also consider the concept of a hierarchy of trusted users (e.g., a hierarchy of trusted users and the number of endorsements). In such an extension, the "super" trusted users may be able to provide an endorsement with high privileges for his or invitee. Additionally, more parallel endorsements can be allowed for a super trusted user (i.e., if the number of people that can be endorsed by a single trusted user at a given time is limited, such as, for example, no more than 2 endorsed invitees at a time). Additionally, in some situations a single invitee can be endorsed by many endorsers, which may influence his or her credibility and possibly move his or her status as a "super" trusted invitee (as therefore be granted more privileges). To another extent, this hierarchy of trusted users can also apply to "known users" who may not be yet considered trusted users. Being endorsed by one "super" trusted user or by several trusted users may help to promote them into a trusted user category.

Regarding the secured communications 8 between the gate 18 and the security server 6, such secured communications can be achieved using standard secured channels (either through wire or wireless) using encrypted communications. Standard secured communication technologies can be implemented here. Communication between the keyring application and the gate access controller can be achieved using technologies such as Wi-Fi, Bluetooth, or NFC. In order to provide more security and avoid "spoofing" (e.g., people capturing shared information so to duplicate this on a not authorized device) a short range communication medium may be preferred such as, for example, Near Field Communication (NFC).

Several application examples can be considered as follows.

Example 1

Consider a facility, where only authorized people (or employees) can access and navigate. When using traditional access control methods, authorized individuals must provide credential when passing a gate (either typing a code or password, or using a dedicated ID badge). This situation works fine when the number of authorized people does not vary greatly. From time to time, however, visitors may arrive for a series of meetings, for example. Usually, using traditional methods, such visitors are provided with a low credential ID badge (or no badge at all). Therefore, when such visitors need to navigate inside the facility, they will always need to be accompanied with a trusted employee to pass gates.

With the disclosed embodiments, however, such visitors can simply download a keyring application ("app") to their smartphones and "pair" with people inviting them, and therefore obtain "some freedom" within the facility. This is much more than a simple badging system because a trusted user can decide whom they endorse, for how long time, which parts of the facility are allowed, and what other criteria must be met to the n-factor authentication can be downgraded to be more convenient for his or her visitors. This is much more flexible and powerful than a standard badging system.

Example 2

Consider a gate securing access to a place (e.g., inside an airport, a train station, a concert, a sport event, etc.). For security reasons, people should check with security agents while passing the gate. In order to avoid the burden of such security examinations, fidelity programs allow frequent users to register and authenticate. Therefore, when the trusted users attend such events, they use special lines with minimal (low-level) authentication factors, but this works only for these individuals. Invited people must still perform the "full-monty." These procedures are costly for event organizers because such procedures require a great number of security officers in order to avoid long lines of people forming in front of the security check points, which can also generate a great deal of frustration for people standing in these lines.

With the disclosed embodiments, however, trusted users are allowed to go through these low-level authentication lanes with their invitees. All they need to do is to download the keyring and pair with the trusted user and then move quickly through the frequent user gate. Therefore, the disclosed embodiments can reduce significantly the time required to pass such a gate.

Example 3

Consider a payment system that requires buyers to provide n-factor authentication so that a transaction can be allowed. In order to facilitate payments, some solutions have been put in place such as the concept of "running sessions," specific cookies within web browser or trusted computers IDs, etc., but these generally apply only for already known (and frequent) buyers. The disclosed embodiments, however, can extend to new users. For example, when a new user wants to buy something, the full n-factor authentication process should theoretically apply, except if the buyer has been "endorsed" by trusted buyers. In such a case, a demand for confirmation can be sent to a paired keyring of a trusted user so he or she can "validate" the transaction (i.e., the full details of the transaction could remain confidential, but information such as who is buying, where, when, for how much could be sent for validation). Therefore the crowd (or more specifically trusted users) provides credentials. Of course to stress the importance of this endorsement, some (e.g., financial) liability can be considered to prevent trusted users from endorsing others carelessly.

Note that the disclosed embodiments can also be applied to an adjacent use case. Parents may authorize their children, for example, to buy items via a specific web portal (e.g., buy features for their games or games on Playstation network or Xbox live networks), but would like to control what their children buy. The disclosed embodiments invention can allow them (the children and/or parents) to be warned about any attempt to buy something and could render a decision as to whether or not allow this purchase. This process allows a network such as the Playstation network or Xbox live network to still "sell stuff" to children in a seamless manner, but with an approval from their parents.

There have been many attempts to either develop stronger security and/or authentication methods. These approaches, however, are generally server centric, which means that users must be known by the server and authorized by some sort of security officer who grants specific access rights. Therefore, users provide identity information through whatever methods such as password, code generated by a synchronized system (e.g., RSA SecurID®), or electronic badge encoding some user details. But in any case, users can only access when appropriate authorization is granted by a security officer and encoded in the security server.

On the other side of the spectrum, some methods are also developed to attempt reducing the burden of full n-factor authentication. In this case, some user centric and local context methods are developed to recognize a frequent user and therefore facilitate his access. These methods are based either on user registration on a sort of "frequent user" database, or the use of seamless user identification through some local context identification methods (e.g., cookies on a web browser when a user buys stuff on a merchant portal).

None of these prior methods use any sort of electronic crowd-based authentication mechanisms, or more specifically a trusted user endorsement system to facilitate access to invited people, without asking them to register on a classic security program.

The illustrative embodiments are described with respect to certain elements, procedures, commands and operations, values, methods of computing, visualization, repository, devices, data processing systems, environments, components, and applications only as examples. Any specific manifestations of these and other similar artifacts are not intended to be limiting to the disclosed embodiments. Any suitable manifestation of these and other similar artifacts can be selected within the scope of the illustrative or example embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures, therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 5:
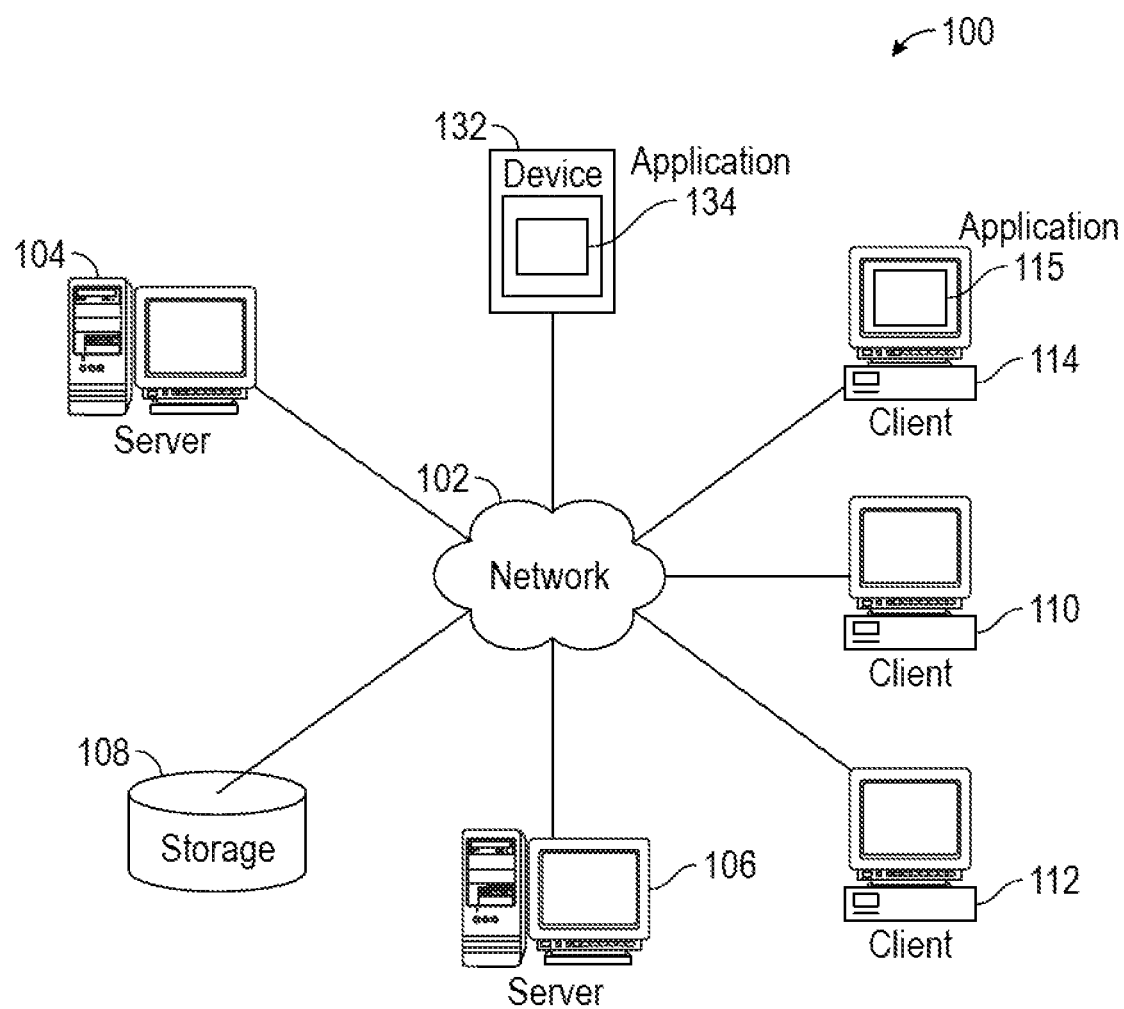
FIG. 5 illustrates a block diagram depicting a network of data processing systems in which example embodiments may be implemented.
Figure 6:
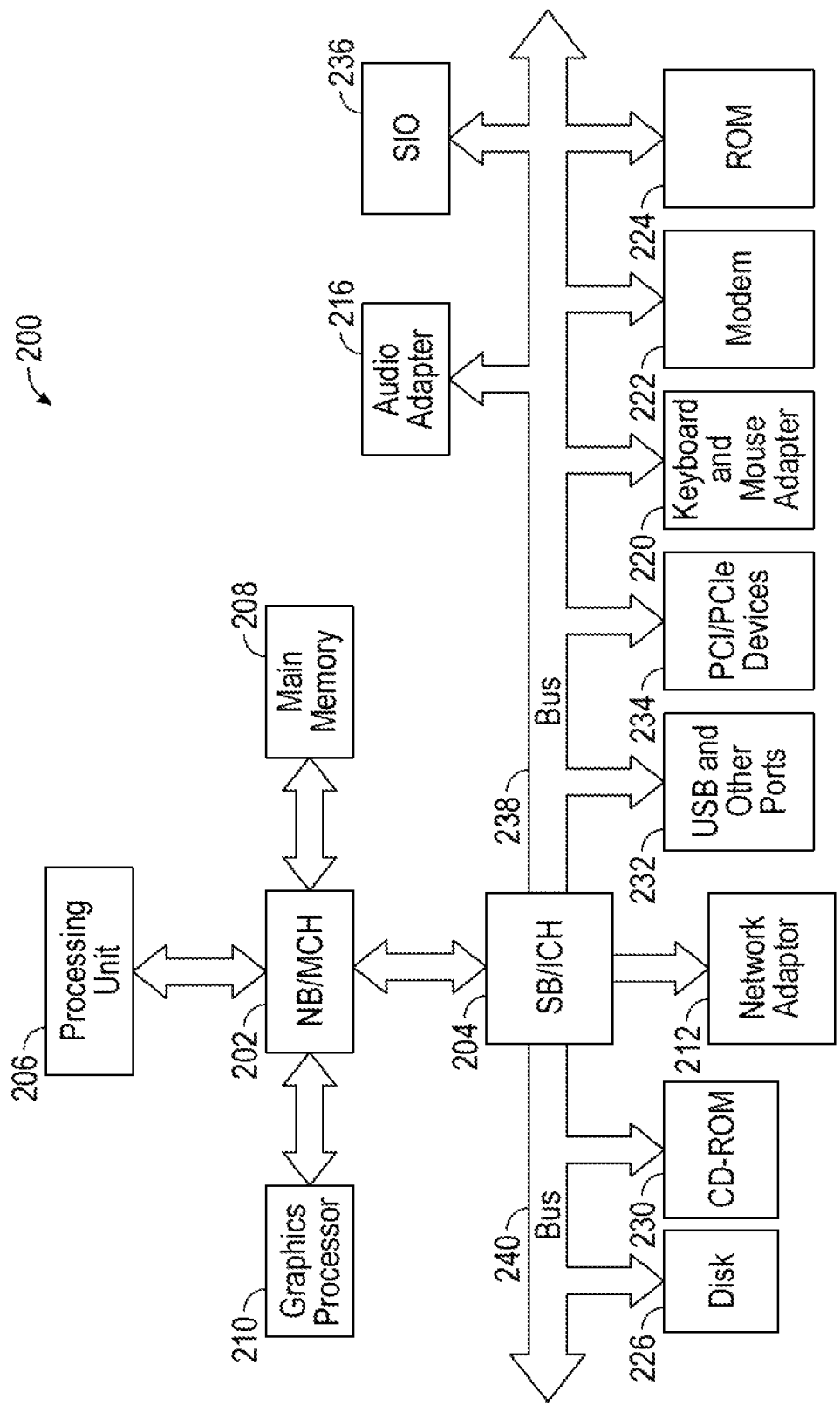
FIG. 6 illustrates a block diagram of a data processing system in which example embodiments may be implemented.

With reference to the figures and in particular with reference to FIGS. 5 and 6, these figures are example diagrams of data processing environments in which illustrative embodiments may be implemented. FIGS. 5 and 6 are only examples and are not intended to assert or imply any limitation with regard to the environments in which different embodiments may be implemented. A particular implementation may make many modifications to the depicted environments based on the following description.

FIG. 5 depicts a block diagram of a network of data processing systems in which illustrative embodiments may be implemented. Such a network of data processing systems constitutes a data processing environment 100 composed of a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 can be coupled to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 5 depicts certain components that are usable in an example implementation of an embodiment. For example, servers 104 and 106 and clients 110, 112, 114 are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 5 can be configured to execute in device 132 in a similar manner. Any data or information stored or produced in another data processing system in FIG. 5 can be stored or produced in device 132 in a similar manner.

Network 102 may be a Wi-Fi network with which client 114 or device 132 attempts to establish data connectivity. When a user's device takes the form of client 114, which as an example may be a laptop computer, application 115 implements an embodiment described herein. When device 132 operates as a user's device, application 134 implements an embodiment described herein. In some example embodiments, the network 102 may be implemented as a wireless network such as a cellular communications network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In some example embodiments, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as, for example, an intranet, a local area network (LAN), or a wide area network (WAN). FIG. 1 is intended as an example and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 6, this figure depicts a block diagram of a data processing system in which illustrative embodiments may be implemented. Data processing system 200 is an example of a computer, such as servers 104 and 106, or clients 110, 112, and 114 in FIG. 5, or another type of device in which computer usable program code or instructions implementing the processes may be located for the illustrative embodiments.

Data processing system 200 is also representative of a data processing system or a configuration therein such as data processing system 132 in FIG. 5 in which computer usable program code or instructions implementing the processes of the illustrative embodiments may be located. Data processing system 200 is described as a computer only as an example, without being limited thereto. Implementations in the form of other devices, such as device 132 in FIG. 5, may modify data processing system 200, such as by adding a touch interface, and even eliminate certain depicted components from data processing system 200 without departing from the general description of the operations and functions of data processing system 200 described herein.

In the depicted example, data processing system 200 can employ a hub architecture including, for example, North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 can be coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 can be coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown) are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 6. The operating system may be a commercially available operating system such as, for example, Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc., licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 115 and 134 in FIG. 5, are located on storage devices, such as hard disk drive 226, and may be loaded into at least one of one or more memories, such as main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 5-6 may vary depending on the implementation. Other internal hardware or peripheral devices, such as flash memory, equivalent non-volatile memory, or optical disk drives and the like, may be used in addition to or in place of the hardware depicted in FIGS. 5-6. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 5-6 and above-described examples are not meant to imply architectural limitations. For example, data processing system 200 also may be a tablet computer, laptop computer, or telephone device in addition to taking the form of a mobile or wearable device.

The disclosed embodiments can be implemented in the context of a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the example embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to example embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The claims, description, and drawings of this application may describe one or more of the instant technologies in operational/functional language, for example, as a set of operations to be performed by a computer. Such operational/functional description in most instances can be specifically configured hardware (e.g., because a general purpose computer in effect becomes a special-purpose computer once it is programmed to perform particular functions pursuant to instructions from program software). Note that the data-processing system 200 discussed herein may be implemented as special-purpose computer in some example embodiments. In some example embodiments, the data-processing system 200 can be programmed to perform the aforementioned particular instructions thereby becoming in effect a special-purpose computer.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein can be a distillation of machine specifications or other physical mechanisms specified by the operations/functions such that the otherwise inscrutable machine specifications may be comprehensible to the human mind. The distillation also allows one skilled in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies), this is not true.

The fact that high-level programming languages use strong abstraction to facilitate human understanding should not be taken as an indication that what is expressed is an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities may also cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a micro architecture that will carry out the instructions defined by that microprocessors defined instruction Set Architecture. The instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one skilled in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognized as a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc., with natural language simply cannot be taken as an indication that such functional/operational technical descriptions are abstract ideas, or mere expressions of abstract ideas. In fact, as outlined herein, in the technological arts this is simply not true. When viewed through the tools available to those skilled in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person skilled in the art in understanding the described subject matter by providing a description that is more or less independent of any specific vendor's piece(s) of hardware.

The use of functional/operational technical descriptions assists the person skilled in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person skilled in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those skilled in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one skilled in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc., in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and/or firmware would be well within the skill of one skilled in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for electronic crowd-based authentication, said method comprising:
   selecting authentication criteria with corresponding validity criteria through a key ring application associated with a trusted user and comprising an interface that allows said trusted user to comprise an endorser who endorses an unregistered user as invitee and to set said validity criteria for endorsing said unregistered user based on at least one of: a type of secured resource to be accessed, a time frame for accessing said secured resource, and a location for accessing said secure resource, wherein said validity criteria comprises endorsement criteria;
   sending a notification to said key ring application associated with said endorser to informer said endorser that said unregistered user desires to access said secure resource;
   pairing said key ring application with authentication data as facilitated by said interface, wherein during said pairing a provisional endorsement is transmitted to a keyring application associated with said invitee along with a trusted user ID and said endorsement criteria;
   transmitting said authentication data for verification by a security server that follows a security policy that defines how a user becomes a trusted user, wherein said security server allows said trusted user to endorse said unregistered user based on said validity criteria to provide said unregistered user with access to said secured resource by said selecting of said authentication criteria, said pairing of said key ring application, and said transmitting of said authentication data for said verification by said security server;
   permitting said security server to communicate electronically with said secured resource through a secured communication port; and
   providing a hierarchy of trusted users in which if said trusted user comprises a super trusted user, the trusted user endorses said invitee with high privileges and wherein said super trusted user receives parallel endorsements from other trusted users in said hierarchy of trusted users.

2. The method of claim 1 further comprising retrieving said key ring application from a server of a client server network.

3. The method of claim 2 wherein said security server is associated with an authorized user database.

4. The method of claim 1 wherein said security server comprises a data-processing system that manages and communicates with at least one gate that protects said secured resource in order to authorize or not authorize an access to said at least one gate.

5. The method of claim 4 wherein said at least one gate is associated with said secured resource and wherein said at least one gate provides said access to said secured resource.

6. The method of claim 1 further comprising providing a secure communication channel between said secured resource and said security server, wherein said secure communication channel permits said security server to communicate with at least one gate protecting said secured resource.

7. The method of claim 6 further comprising providing said secure communication channel through a packet-based wireless data communications channel that communicates with said key ring application running on a client device associated with said trusted user.

8. The method of claim 7 wherein said packet-based wireless data communications channel is associated with a packet-based wireless communications network comprising at least one of a cellular network and a WiFi network.

9. A system for electronic crowd-based authentication, said system comprising:
   a memory and a processor;
   a key ring application stored in said processor and implemented by said processor, wherein said key ring application is associated with a trusted user and comprises an interface that allows said trusted user to comprise an endorser who endorses an unregistered user as an invitee and to set validity criteria for endorsing said unregistered user based on at least one of a type of secured resource to be accessed, a time frame for accessing said secured resource, and a location for accessing said secure resource, said validity criteria comprising endorsement criteria, wherein authentication criteria with corresponding said validity criteria is selected through said key ring application and wherein said key ring application is paired with authentication data as facilitated by said interface, wherein a notification is sent to said key ring application associated with said endorser to inform said endorser that said unregistered user desires to access said secure resource, and wherein during a pairing of said key ring application with said authentication data, a provisional endorsement is transmitted to a keyring application associated with said invitee along with a trusted user ID and said endorsement criteria;
   a security server and a secured resource, wherein said authentication data is transmitted for verification by said security server, which is operable to follow a security policy that defines how a user becomes a trusted user, wherein said security server allows said trusted user to endorse said unregistered user based on said validity criteria to provide said unregistered user with access to said secured resource by said selecting said authentication criteria, said pairing of said key ring application, and said transmitting of said authentication data for said verification by said security server; and
   wherein said key ring application is retrieved from a server of a client server network, and wherein a hierarchy of trusted users is provided in which if said trusted user comprises a super trusted user, the trusted user endorses said invitee with high privileges and wherein said super trusted user receives parallel endorsements from other trusted users in said hierarchy of trusted users.

10. The system of claim 9 wherein said security server is associated with an authorized user database.

11. The system of claim 10 further wherein said security server communicates electronically with said secured resource through a secured communication port.

12. The system of claim 11 wherein said security server comprises a data-processing system that manages and communicates with at least one gate that protects said secured resource in order to authorize or not authorize an access to said at least one gate.

13. The system of claim 12 wherein said at least one gate is associated with said secured resource and wherein said at least one gate provides said access to said secured resource.

14. The system of claim 9 further comprising a secure communication channel between said secured resource and said security server, wherein said secure communication channel permits said security server to communicate with at least one gate protecting said secured resource.

15. The system of claim 14 further wherein said secure communication channel is provided through a packet-based wireless data communications channel that communicates with said key ring application running on a client device associated with said trusted user.

16. The system of claim 15 wherein said packet-based wireless data communications channel is associated with a packet-based wireless communications network comprising at least one of a cellular network and a WiFi network.

17. A system for electronic crowd-based authentication, said system comprising:
   at least one processor; and
   a non-transitory computer-usable medium embodying computer program code, said computer-usable medium capable of communicating with said at least one processor, said computer program code comprising instructions executable by said at least one processor and configured for:
      selecting authentication criteria with corresponding validity criteria through a key ring application associated with a trusted user and comprising an interface that allows said trusted user to comprise an endorser who endorses an unregistered user as invitee and to set said validity criteria for endorsing said unregistered user based on at least one of: a type of secured resource to be accessed, a time frame for accessing said secured resource, and a location for accessing said secure resource, wherein said validity criteria comprises endorsement criteria;
      sending a notification to said key ring application associated with said endorser to informer said endorser that said unregistered user desires to access said secure resource;
      pairing said key ring application with authentication data as facilitated by said interface, wherein during said pairing a provisional endorsement is transmitted to a keyring application associated with said invitee along with a trusted user ID and said endorsement criteria;
      transmitting said authentication data for verification by a security server that follows a security policy that defines how a user becomes a trusted user, wherein said security server allows said trusted user to endorse said unregistered user based on said validity criteria to provide said unregistered user with access to said secured resource by said selecting of said authentication criteria, said pairing of said key ring application, and said transmitting of said authentication data for said verification by said security server;
      permitting said security server to communicate electronically with said secured resource through a secured communication port, wherein said security server comprises a data-processing system that manages and communicates with at least one gate that protects said secured resource in order to authorize or not authorize an access to said at least one gate and wherein said at least one gate is associated with said secured resource and wherein said at least one gate provides said access to said secured resource; and
      providing a hierarchy of trusted users in which if said trusted user comprises a super trusted user, the trusted user endorses said invitee with high privileges and wherein said super trusted user receives parallel endorsements from other trusted users in said hierarchy of trusted users.

18. The system of claim 17 wherein said security server is associated with an authorized user database.

19. The system of claim 17 wherein said instructions are further configured for:
- providing a secure communication channel between said secured resource and said security server, wherein said secure communication channel permits said security server to communicate with at least one gate protecting said secured resource; and
- providing said secure communication channel through a packet-based wireless data communications channel that communicates with said key ring application running on a client device associated with said trusted user.

20. The system of claim 19 wherein said packet-based wireless data communications channel is associated with a packet-based wireless communications network comprising at least one of a cellular network and a WiFi network.

* * * * *